United States Patent [19]
Golz

[11] 4,189,532
[45] Feb. 19, 1980

[54] BATTERY ELECTRODE WITH EXPANDER

[75] Inventor: Hans-Joachim Golz, Hanover, Fed. Rep. of Germany

[73] Assignee: Varta Batterie Aktiengesellschaft, Hanover, Fed. Rep. of Germany

[21] Appl. No.: 928,053

[22] Filed: Jul. 26, 1978

[30] Foreign Application Priority Data

Aug. 16, 1977 [DE] Fed. Rep. of Germany ....... 2736750

[51] Int. Cl.² ............................................. H01M 4/62
[52] U.S. Cl. .................................................... 429/215
[58] Field of Search ......................................... 429/215

[56] References Cited

U.S. PATENT DOCUMENTS

| | | | |
|---|---|---|---|
| 2,683,183 | 7/1954 | Hole | 429/215 |
| 2,837,589 | 6/1958 | Konig | 429/215 |

*Primary Examiner*—Donald L. Walton
*Attorney, Agent, or Firm*—Weiser, Stapler & Spivak

[57] ABSTRACT

Expander is introduced into the negative electrode in the form of particles encapsulated with material which gradually releases the expander over the life of the battery.

4 Claims, No Drawings

BATTERY ELECTRODE WITH EXPANDER

The invention relates to a negative electrode for lead storage batteries which contains an expander, as well as to a method for its manufacture.

The use of expanders or loosening means in the negative plates of lead storage batteries is currently widely prevalent. By interfering with lead separation during charging, they are intended to counteract the formation of compact lead crystals, and thereby to maintain the highly porous structure of the plate. Therefore, their presence is indispensable for high current load capacity of the battery, and particularly for good cold starting performance.

Since expanders are compounds of high molecular weight, but chemically poorly defined and of limited solubility in water, they gradually decompose through oxidation in the course of the cycles in the life of the storage battery. This loss of expander and the accompanying decline in cold starting performance is compensated by providing, in the mass formulations of the negative plates, a heavy excess of expander and also of lead.

Under these circumstances, there can be drawn from the fresh storage battery a cold test current whose amperage corresponds to about 3.5 times its 20-hour capacity. For a 12 volt, 84 ampere-hour battery, this corresponds to a current of 294 amperes. Such an elevated cold starting performance, which can be even further enhanced with decreasing plate thickness, far exceeds the practical requirements. In many cases, even a five-year old automobile battery is still capable of starting the vehicle even in the cold. In that case, about 4/5 of the initially provided expander material has decomposed by that time, so that only 1/5 remains available for use, and this evidently suffices to activate the electrode. On the other hand, exhaustion of the expander can also have taken place after three or four years.

This relatively wide distribution of operating life spans is undesirable; it is preferred to narrow it down to the currently available maximum values, so that the average life expectancy of the starter battery is increased.

In that connection, it must also be noted that the manufacturing parameters of a starter battery are currently controlled to such a degree that only a very narrow distribution of life spans can be justified.

This is demonstrated by means of numerous laboratory life tests. The decisive factors in determining the distribution include varying driving conditions encountered in city or country traffic, varying types of motor vehicles, and finally the use by the driver himself in accordance with his individual driving technique. It is these various influences which impose varying demands upon currently available expanders, and therefore decisively contribute to a considerable dispersion of their life span values.

Accordingly, it is an object of the invention to provide a negative lead electrode which has a narrow distribution in its life span, and in which the expander is optimally utilized.

This and other objects which will appear are accomplished in accordance with the invention by providing the expander within the electrode in the form of particles, encapsulated in a material which dissolves gradually over the life of the storage battery.

Thus, the major portion of the expander is temporarily placed in storage, and is activated only in accordance with consumption, so that the concentration of active expander remains approximately constant over time.

As the encapsulating material there may be used polymeric organic materials of high molecular weight and, if desired also copolymers of various synthetic resin monomers, which are stable in conventional storage battery acids, but are attacked by active hydrogen, either by breakup of existing carbon double bonds or by reduction and splitting of oxygen-containing side chains.

Preferably, the molecules of the encapsulating material have a dipole characteristic, which enables them to adhere to the expander particles with specific orientations determined by their surface charge, and to enclose them in a layer of greater or lesser thickness. Both the size of the expander particles themselves, as well as the thickness of the encapsulation are distributed over a wide spectrum. This insures that the capsules break open at different times, and these times are statistically distributed over the entire life span of the battery in such a manner that the expander quantity so released just replaces the losses stemming from decomposition and remains approximately at a constant average value over time.

In this way, there is not only obtained optimum utilization of the expander, but more particularly the quantity of lead powder used per negative plate can be substantially reduced. That is because conventional formulations require a relationship of lead powder to expander which corresponds to the full activity of the latter in a fresh battery. However, this does not take into account the high degree of exhaustion of the expander at the end of the life span, which also causes inactivation of a substantial portion of the active mass due to grain enlargement of the lead sponge, which could therefore have been saved right from the start.

For the battery manufacturer there are economic advantages in such a saving of raw material. Yet, the consumer suffers no detriment, since he receives, by virtue of the invention, a battery with undiminshed capacity and with more uniform cold starting performance.

For the manufacture of an encapsulation in accordance with the invention there exist basically two methods, namely 1. Spray Drying In this method, finely ground oxilignin (Vanisperse A) for example, is suspended in water. By addition of a suitable hydrophilic colloid (e.g. gelatin), which adheres to the expander particles through partial displacement of their hydrate envelopes, there is produced a dispersion which is temporarily stable. In so doing, the surface tension of the colloid must exceed that of the dispersion medium (water), or else no encapsulation ensues. The dispersion is then forced through nozzles into a spray dryer, in which the descending droplets encounter a hot air stream coming from below. This quickly evaporates the water. The water-less dried material may be subjected to a follow-up treatment, in which hardening of the encapsulating material takes place.

The spray drying may also be carried out with a non-aqueous dispersion. In that case, a hydrophobic colloid, for example, a resin envelops the hydrophillic expander as a dispersed phase. During spraying, there is removed only the volatile dispersion medium whereas the resin forms a firm capsule around the expander particles.

By means of spray drying, there are produced not only enclosed capsules but also capsules which are partially open, i.e. porous.

2. Liquid Encapsulation (Micro-Encapsulation)

For this method, there is produced a suspension of the expander in a liquid which is preferaby non-aqueous and which initially contains the encapsulating material in solution. This may also consist of a synthetic resin or an organic element. By agitating the suspension with a neutral salt or addition of water, the polymer is separated out in the form of minute droplets which then precipitate upon the suspended expander particles as envelopes therefor. By removing the remaining solvent from the encapsulating material (desolvation) or by chemical bonding, the envelope can be strengthened.

I claim:

1. A negative electrode for lead storage batteries containing an expander wherein
    the expander is present in the electrode in the form of particles which are provided with an encapsulation, the material of which dissolves over the life of the storage battery.
2. The electrode of claim 1 wherein
    different ones of the particles are covered with encapsulating material of different thickness.
3. The electrode of claim 2 wherein
    different ones of the particles have different sizes.
4. The electrode of claim 1 wherein
    some of the particles are only partially covered with encapsulating material.